United States Patent [19]

Fanning

[11] Patent Number: 5,395,291

[45] Date of Patent: Mar. 7, 1995

[54] COLOR CODED MASTER LINK FOR AN ENDLESS DRIVE CHAIN

[76] Inventor: Thomas P. Fanning, 206 Lake Shore Dr., Lindenhurst, Ill. 60046

[21] Appl. No.: 131,088

[22] Filed: Oct. 1, 1993

[51] Int. Cl.⁶ ............................................. F16G 13/00
[52] U.S. Cl. ..................................... 474/206; 474/218
[58] Field of Search ....................... 474/206, 212–215, 474/218, 219

[56] References Cited

U.S. PATENT DOCUMENTS

| | | | |
|---|---|---|---|
| 580,449 | 4/1897 | Caldwell | 474/218 |
| 1,121,053 | 12/1914 | Terry | 474/218 |
| 3,847,031 | 11/1974 | Araya | 474/218 X |
| 3,885,445 | 5/1975 | Montano | 474/218 |
| 3,939,721 | 2/1976 | Kuenzig et al. | 474/218 |

*Primary Examiner*—Michael P. Buiz
*Attorney, Agent, or Firm*—Charles F. Meroni, Jr.

[57] ABSTRACT

The color coded safety master link is a modified master link used in endless roller chain drives. The invention allows the master link to be safely and quickly located while at the same time indicating the size of the endless roller chain. An extended first pin and extended second pin are connected to a first pin link plate. A second pin link plate engages the extended first pin and extended second pin. A color coded extension pin link plate engages the extended first pin and extended second pin. A locking pin link plate is provided for securing the extension pin link plate to the extended first pin and extended second pin, allowing the master link to remain in place when the roller chain drive is in operation.

13 Claims, 2 Drawing Sheets

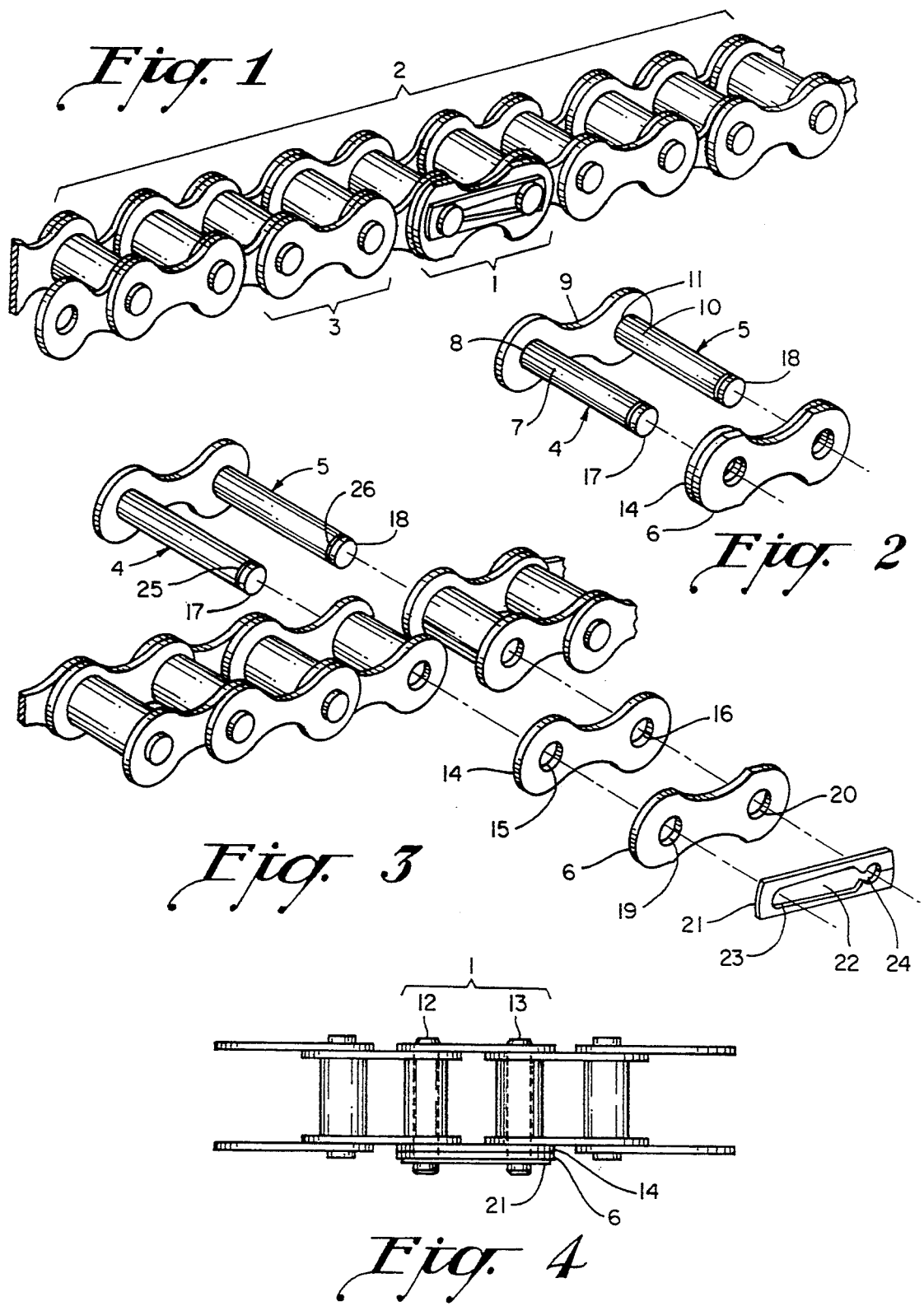

COLOR CODED MASTER LINK FOR AN ENDLESS DRIVE CHAIN

BACKGROUND OF THE INVENTION

1. Field of the Invention

The present invention relates generally to master links used in endless roller chain drives. More particularly, the invention relates to an improved master link having extended pins to receive a color coded extension plate for identification and safety purposes.

2. Description of the Prior Art

Many styles of roller chain drives have been developed. A master link is used to connect two ends of a roller chain together, creating an endless or continuous loop. In previously known master links, the idea of adapting the master link to contain a color coded extension pin link plate for both identification and safety purposes has never been implemented.

Color coded identification methods have been seen in other art fields. However, these methods are used in identifying different tools and not machinery components. Furthermore, other identification methods solve the problem of being unable to easily distinguish one known tool from another. The present invention solves the problem of not being able to easily and safely find a master link within an endless chain drive system.

U.S. Pat. No. 1,984,839 discloses an identification means for tools such as drills, reamers, and taps. The invention applies a color identification to the threads of a drill or to a recessed portion on the shank of the drill.

U.S. Pat. No. 2,915,926 discloses a color coded drill and reamer that has a matching color coded bushing. This invention seeks to avoid the unnecessary waste of time that is occasioned in matching tools with the corresponding bushings.

U.S. Pat. No. 4,671,916 discloses a method for identifying medical or surgical instruments as belonging to a group or set. The instruments are drilled to form a bore and then fitted with a plug for identification.

U.S. Pat. No. 4,841,653 discloses a method for identifying different types of wrenches. Color markings are applied to the wrenches through the application of a single band of colored tape to each tool.

In the present invention, color coding the extension pin link plate will allow the master link to be quickly identified. Different colors will indicate different chain sizes. However, the present invention also solves another problem that the prior art does not address. This is a problem involving chain drive repair and maintenance.

To repair or service a chain drive, it is first necessary to find the master link so that the chain may be removed. An ordinary master link closely resembles every other chain link. This makes it difficult to find the master link, especially when the chain can be ten or twenty feet long. Since the chain is often covered with grease, oil, and dirt, the difficulty is increased. Under these conditions, a repairman will need to reach into the machinery to wipe off part of the chain. It is then often necessary for the machine to be quickly turned on and off in order to move the chain into a slightly new position. This process of wiping the chain and operating the machine will continue until the master link is located.

This process often involves two people. A repairman will be reaching into the machine to wipe the chain and a second person will be standing at control panel, sometimes a distance away from the repairman. During this process, there is a possibility of the machine being accidentally operated while the repairman's hands and fingers are in contact with the chain, which may cause serious injury.

The present invention solves this problem. The pins of the master link are extended so that an additional extension pin link plate may be attached. The extension pin link plate is color coded so that it may be easily seen. In addition, since the master link now has longer pins, it is more visible when coated with grease, oil, and dirt. Therefore, the master link can be located without subjecting the repairman to the possibility of injury.

SUMMARY OF THE INVENTION

Endless roller chain assemblies are commonly used in mechanical equipment. An endless roller chain assembly is commonly constructed from a plurality of end to end connected chain link assemblies. A master link is used to connect the two ends of the chain together. The present invention allows the master link to be safely and quickly located within the endless chain. In addition, the master link is color coded to allow the size of the chain to be easily determined.

In one form the invention, the master link has two pins that are extended in length. The pins connect on one end to a pin link plate. The other end of the pin are inserted into apertures located on a second pin link plate. An extension pin link plate made out of some durable material is colored by paint or some other coloring substance. The pins are then inserted into apertures located on the extension pin link plate. A means for securing the extension pin link plate to the pins is then attached. For example, a locking plate may be attached which engages grooves that have been cut into the pins.

A method of identifying a master chain link in an endless chain drive comprises the step of extending the pins of a master chain link so that they can accommodate an additional extension pin link plate. The pins are secured to a first pin link plate. This may be achieved by engaging each pin into an aperture on the first pin link plate. The next step is optional and involves connecting an extension pin link plate to a second pin link plate with adhesive. While this step is not necessary, it will prevent assembly of the master link without including the extension pin link plate. The second pin link plate is connected to the pins by inserting the first pin into a first aperture of the second pin link plate and inserting the second pin into a second aperture of the second pin link plate. Next, the extension pin link plate can be color coded by applying a paint or other coloring substance. The color used will allow the master link to be more visible and to identify the size of the chain. The extension pin link plate is connected to the pins by inserting the first pin into a first aperture of the extension pin link plate and inserting the second pin into a second aperture of the extension pin link plate. Alternatively, the extension pin link plate could be made of a thickness which would incorporate the thickness of the second pin link plate so that the second pin link plate is not necessary.

Both the master link and method described can be executed in an economical fashion. The existing roller chain components are used. The only additional components include the extended master link pins and the extension pin link plate. This provides for an inexpensive way to increase efficiency and safety in the maintenance and repair of roller chain drives.

BRIEF DESCRIPTION OF THE DRAWINGS

FIG. 1 is an assembled perspective view of a segment of an endless roller chain assembly which includes a color coded safety master link.

FIG. 2 is an exploded perspective view of a color coded safety master link.

FIG. 3 is an exploded assembly view of the embodiment of FIG. 1.

FIG. 4 is an assembled top view of the embodiment of FIG. 1.

DESCRIPTION OF THE PREFERRED EMBODIMENTS

Figure 5:
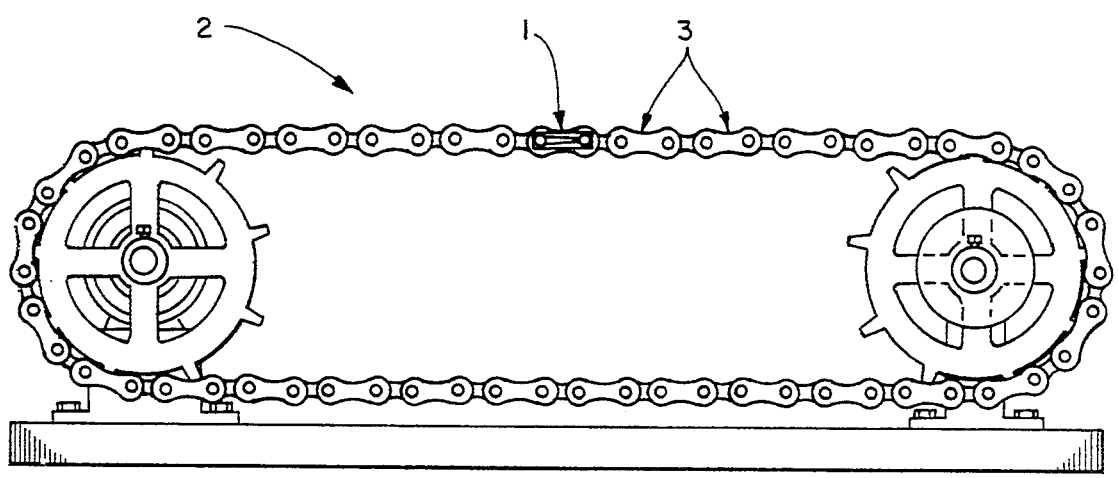
FIG. 5 is a side view of an endless roller chain drive which includes a color coded safety master link.

The present invention involves an improved master link 1 used in an endless roller chain assembly 2 as seen in FIG. 1 and FIG. 5. An endless roller chain assembly 2 is constructed from a plurality of end to end connected chain link assemblies 3. The master link 1 is then used to connect the two ends of an endless roller chain assembly 2. The master link 1 is modified so that it may be safely and quickly identified. In addition, the present invention will determine the size of the chain based upon a color coding scheme used on part of the master link. FIG. 1 illustrates an assembled perspective view of part of an endless roller chain assembly 2 which includes a color coded safety master link 1.

Figure 6:
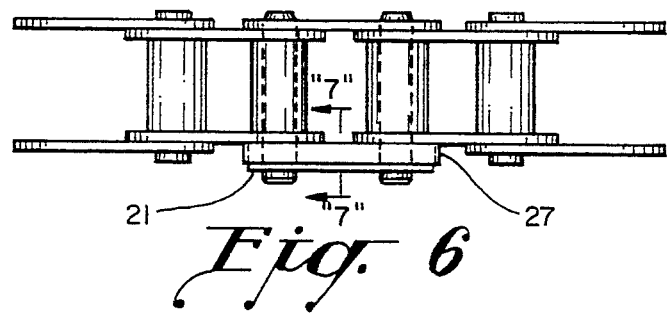
FIG. 6 is an assembled top view of an embodiment using a single extension pin link plate.

FIG. 2 is an exploded perspective view of a color coded safety master link 1. Extended first pin 4 and extended second pin 5 have been extended in length to accommodate an additional extension pin link plate 6. The extension pin link plate 6 may have a thickness between 0.0625 and 0.130 of an inch. The thickness of the extension pin link plate 6 should be approximately equal to the additional pin length used in the master link 1. For example, the extension pin link plate 6 will have a thickness approximately equal to the difference in length between the extended first pin 4 of the master link 1 and a first pin of each chain link assembly 3, as best illustrated in FIGS. 4 and 6. This difference being equal to the difference in length between the extended second pin 5 of the master link 1 and a second pin of each chain link assembly 3. As shown in FIGS. 4 and 6, the extension pin link plate 6 extends in a spaced apart planar relationship from pin link plates of the other chain link assemblies 3. The following chart indicates the additional pin length required under various ANSI single and double chain standards:

| Manufacturer Designation | Single Chain | Double Chain | Additional Pin Length | New Single Chain Length | New Double Chain Length |
| --- | --- | --- | --- | --- | --- |
| ANSI #35 | 0.5 | 0.913 | — | 0.562 | 0.976 |
| ANSI #40 | 0.575 | 1.255 | 0.0625 | 0.638 | 1.318 |
| ANSI #41 | 0.565 | N/A | 0.0625 | 0.628 | N/A |
| ANSI #50 | 0.851 | 1.575 | 0.125 | 0.976 | 1.7 |
| ANSI #60 | 1.071 | 1.955 | 0.125 | 1.196 | 2.08 |
| ANSI #80 | 1.375 | 2.512 | 0.125 | 1.5 | 2.637 |
| ANSI #100 | 1.675 | 3.185 | 0.125 | 1.8 | 3.31 |

The measurements are in inches as measured from the beginning to the end of the pin. The additional pin length for metric sizes M5 and larger could also be 0.125 inches.

The extended first pin 4 has a first end portion 7 which engages a first aperture 8 of a first pin link plate 9, as seen in FIG. 2. The extended second pin 5 has a first end portion 10 which engages a first aperture 8 of a the first pin link plate 9. As best illustrated in FIG. 4, the extended first pin 4 could have a first flanged head 12. This would ensure that the first end portion 7 of the extended first pin 4 remains engaged with the first aperture 8 of the first pin link plate 9. The extended second pin 5 could also have a second flanged head 13 ensuring that the first end portion 10 of the extended second pin 5 remains engaged with the second aperture 11 of the first pin link plate 9.

As best illustrated in FIG. 3, a second pin link plate 14 has a first aperture 15 and a second aperture 16. The second pin link plate 14 is in a planar relationship with the second pin link plates of each additional chain link assembly 3, as shown in the drawings. A second end portion 17 of the extended first pin 4 is inserted through the first aperture 15 of the second pin link plate 14. A second end portion 18 of the extended second pin 5 is inserted through the second aperture 16 of the second pin link plate 14. A color coded extension pin link plate 6 has a first aperture 19 and a second aperture 20. The second end portion 17 of the extended first pin 4 is inserted through the first aperture 19 of the extension pin link plate 6. The second end portion 18 of the extended second pin 5 is inserted through the second aperture 20 of the extension pin link plate 6.

The extension pin link plate 6 may be color coded by a variety of different methods. For example, a porcelain or epoxy paint may be used if the extension pin link plate 6 is constructed of steel. The extension pin link plate 6 could also be stamped with an impression, stripe, or other mark that would both indicate the size of the endless roller chain assembly 2 and allow the master link 1 to be more readily visible.

Figure 7:
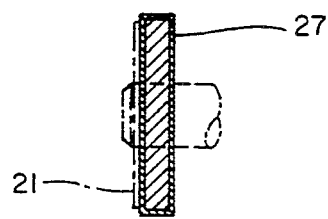
FIG. 7 is a top view of the single extension pin link plate of FIG. 6 coated with a porcelain paint.

As illustrated in FIG. 2, the second pin link plate 14 may be connected to the extension pin link plate 6 with adhesive. This embodiment of the invention will prevent assembly of the master link 1 without including the extension pin link plate 6. Alternatively, the extension pin link plate 6 could be made of a thickness which would incorporate the thickness of the second pin link plate 14 so that the second pin link 14 is not necessary. Therefore, the second pin link plate 14 and extension pin link plate 6 seen in FIG. 2 would make up a single extension pin link plate 27, as illustrated in FIG. 6 and FIG. 7. The single extension pin link plate 27 has been coated at 28 with a porcelain or similar paint in FIG. 7.

The modified form of my invention shown in FIG. 6 and FIG. 7 shows the modified plate 27 is illustrated. The plate 27 has a thickness that corresponds to the thickness of the two plates shown in FIG. 6 and FIG. 14. In this form of my invention, there is only a single link plate. This link plate has a wider thickness than either of the link plates 6 and 14.

As illustrated in FIG. 3, a means for securing the extension pin link plate 6 to the extended first pin 4 and extended second pin 5 is accomplished. A locking pin link plate 21 has an aperture 22 with a first inner aperture surface 23 and a second inner aperture surface 24. The first inner aperture surface 23 engages a first groove 25 on the second end portion 17 of the extended first pin 4. The second inner aperture surface 24 engages a second groove 26 on the second end portion 18 of the extended second pin 5. The locking pin link plate 21 holds the master link 1 together as seen in FIG. 4 and FIG. 7.

The invention has been described in detail with particular reference to preferred embodiments, but it will be understood that variations and modifications may be made in the disclosed subject matter without departing from the scope of the invention as defined in the appended claims.

I claim:

1. In an endless roller chain assembly having a plurality of end to end connected chain link assemblies, the improvement of a master link comprising:
   (a) a first pin link plate;
   (b) an extended first pin operatively connected to the first pin link plate, the extended first pin having a length greater than that of a first pin of each additional chain link assembly of the endless roller chain assembly;
   (c) an extended second pin operatively connected to the first pin link plate, the extended second pin having a length greater than that of a second pin of each additional chain link assembly of the endless roller chain assembly;
   (d) a second pin link plate engaging the extended first pin and the extended second pin, the second pin link plate being in a planar relationship with second pin link plates of each additional chain link assembly;
   (e) a color coded extension pin link plate engaging the extended first pin and the extended second pin, the color coded extension pin link plate extending in a spaced apart planar relationship from the second pin link plate, the color coded extension pin link plate having a thickness approximately equal to a first difference in length between the extended first pin of the master link and the first pin of each additional chain link assembly, the first difference in length being equal to a second difference in length between the extended second pin of the master link and the second pin of each additional chain link assembly; and
   (f) means for securing the extension pin link plate to the extended first pin and to the extended second pin.

2. The endless roller chain of claim 1, wherein the second pin link plate and the extension pin link plate make up a single extension pin link plate possessing a thickness equal to the combined thickness of the previous second pin link plate and extension pin link plate.

3. The endless roller chain of claim 1, wherein the second pin link plate and the extension pin link plate are connected with adhesive.

4. The endless roller chain of claim 1, wherein the means for securing the extension pin link plate is a locking pin link plate having an aperture with an first inner surface and a second inner surface, where the first inner surface engages a first groove on the extended first pin and the second inner surface engages a second groove on the extended second pin.

5. A master link for connecting opposite ends of an endless roller chain assembly, the endless roller chain assembly having a plurality of end to end connected chain link assemblies, the master link comprising:
   (a) a first pin link plate;
   (b) an extended first pin operatively connected to the first pin link plate, the extended first pin having a length greater than that of a first pin of each additional chain link assembly of the endless roller chain assembly;
   (c) an extended second pin operatively connected to the first pin link plate, the extended second pin having a length greater than that of a second pin of each additional chain link assembly of the endless roller chain assembly;
   (d) a second pin link plate engaging the extended first pin and the extended second pin, the second pin link plate being in a planar relationship with second pin link plates of each additional chain link assembly;
   (e) a color coded extension pin link plate engaging the extended first pin and the extended second pin, the color coded extension pin link plate extending in a spaced apart planar relationship from the second pin link plate, the color coded extension pin link plate having a thickness approximately equal to a first difference in length between the extended first pin of the master link and the first pin of each additional chain link assembly, the first difference in length being equal to a second difference in length between the extended second pin of the master link and the second pin of each additional chain link assembly; and
   (f) means for securing the extension pin link plate to the extended first pin and to the extended second pin.

6. The master link of claim 5, wherein the second pin link plate and the extension pin link plate make up a single extension pin link plate possessing a thickness equal to the combined thickness of the previous second pin link plate and extension pin link plate.

7. The master link of claim 5, wherein the second pin link plate and the extension pin link plate are connected with adhesive.

8. The master link of claim 5, wherein the means for securing the extension pin link plate is a locking pin link plate having an aperture with an first inner surface and a second inner surface, where the first inner surface engages a first groove on the extended first pin and the second inner surface engages a second groove on the extended second pin.

9. A master link for connecting opposite ends of an endless roller chain assembly, the endless roller chain assembly having a plurality of end to end connected chain link assemblies, the master link comprising:
   (a) a first pin link plate having a first aperture and a second aperture;
   (b) an extended first pin having a first end portion engaging the first aperture of the first pin link plate, the extended first pin having a length greater than that of a first pin of each additional chain link assembly of the endless roller chain assembly;
   (c) an extended second pin having a first end portion engaging the second aperture of the first pin link plate, the extended second pin having a length greater than that of a second pin of each additional chain link assembly of the endless roller chain assembly;
   (d) a second pin link plate having a first aperture and a second aperture such that a second end portion of the extended first pin is inserted through the first aperture of the second pin link plate and a second end portion of the extended second pin is inserted through the second aperture of the second pin link plate, the second pin link plate being in a planar relationship with second pin link plates of each additional chain link assembly;

(e) a color coded extension pin link plate having a first aperture and a second aperture such that the second end portion of the extended first pin is inserted through the first aperture of the extension pin link plate and the second end portion of the extended second pin is inserted through the second aperture of the extension pin link plate, the color coded extension pin link plate extending in a spaced apart planar relationship from the second pin link plate, the color coded extension pin link plate having a thickness approximately equal to a first difference in length between the extended first pin of the master link and the first pin of each additional chain link assembly, the first difference in length being equal to a second difference in length between the extended second pin of the master link and the second pin of each additional chain link assembly; and (f) means for securing the extension pin link plate to the extended first pin and to the extended second pin.

10. The master link of claim 9, wherein the second pin link plate and the extension pin link plate make up a single extension pin link plate possessing a thickness equal to the combined thickness of the previous second pin link plate and extension pin link plate.

11. The master link of claim 9, wherein the second pin link plate and the extension pin link plate are connected with adhesive.

12. The master link of claim 9, wherein the means for securing the extension pin link plate is a locking pin link plate having an aperture with an first inner surface and a second inner surface, where the first inner surface engages a first groove on the second end portion of the extended first pin and the second inner surface engages a second groove on the second end portion of the extended second pin.

13. A method of identifying a master link in an endless roller chain assembly, the endless roller chain assembly having a plurality of end to end connected chain link assemblies with opposite ends of the roller chain assembly connected together with the master link, the method comprising the steps of:

(a) applying a color coding to an extension pin link plate to correspond to particular sizes of chain and ensure visibility of the master link;

(b) extending a first pin and a second pin of the master link in length so to accommodate the extension pin link plate, the first pin and the second pin of the master link having a length greater than pins of the chain link assemblies; and (c) securing the extension pin link plate by inserting the first pin into a first aperture of the extension pin link plate and inserting the second pin into a second aperture of the extension pin link plate so that the extension pin link plate extends in a spaced apart planar relationship from pin link plates of the chain link assemblies.

* * * * *